United States Patent
Grundy et al.

(10) Patent No.: US 10,678,611 B2
(45) Date of Patent: Jun. 9, 2020

(54) FACILITY MONITORING SENSOR

(71) Applicant: AVTECH Software, Inc., Warren, RI (US)

(72) Inventors: Richard Grundy, Warren, RI (US); Dell Sala, Warren, RI (US); Leili Azadivar, Warren, RI (US)

(73) Assignee: AVTECH Software, Inc., Warren, RI (US)

( * ) Notice: Subject to any disclaimer, the term of this patent is extended or adjusted under 35 U.S.C. 154(b) by 0 days.

(21) Appl. No.: 16/040,150

(22) Filed: Jul. 19, 2018

(65) Prior Publication Data
US 2020/0026585 A1    Jan. 23, 2020

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |
| *G06F 3/0482* | (2013.01) |
| *H04W 4/70* | (2018.01) |
| *G08B 29/04* | (2006.01) |
| *G08B 21/02* | (2006.01) |

(52) U.S. Cl.
CPC ............ *G06F 9/542* (2013.01); *G06F 3/0482* (2013.01); *G08B 21/02* (2013.01); *G08B 29/04* (2013.01); *H04W 4/70* (2018.02)

(58) Field of Classification Search
CPC ....................................................... G06F 9/542
USPC ............................................................ 719/318
See application file for complete search history.

(56) References Cited

U.S. PATENT DOCUMENTS

2018/0284735 A1* 10/2018 Cella ................... G05B 23/024

* cited by examiner

*Primary Examiner* — Timothy A Mudrick
(74) *Attorney, Agent, or Firm* — Armis IP Law, LLC (57) ABSTRACT

A facility monitoring system and application receives and interprets readings from multiple sensors for determining a condition, alert or alarm and initiating appropriate notifications. Low-cost, deployed sensors detect or receive a parameter pertaining to a condition in a physical space, such as temperature, electric flow, or an open door. A channel to a remote monitoring server or application receives and reports the reading via a user accessible GUI (graphical user interface). A compound or aggregate value is computed from multiple channels based on readings from a plurality of sensors, thus allowing reporting of conclusory conditions based on several related readings, rather than a single scalar sensor value that imposes a burden on the user to deduce or investigate other related sensor readings. A GUI receives aggregation processor defining computations to be performed on readings from the multiple sensors, and alert processor defining conditions and alerts representative of issues requiring attention.

18 Claims, 7 Drawing Sheets

New Compound Sensor 182

Name: [High Temp and AC Has Failed] — 704

Type:
- ○ ▣ Aggregate
- ● ⓘ Condition ← 604
- ○ ▤ Compulation

Conditions: R32-Data Center Interval Sensor-Temperature>80.00° F⊖  702
R32-Data Center AC Power Draw-Analog Voltage <1.00V ⊖

Device: [Select a Drive ▲▼]

[+ Add Condition]

[Create Sensor]  [cancel]

Devices ⓘ                                        [New Compound Sensor]

≡ Inventory  ○ Map   ⴷ Compound Sensors  🔍        802

| Name | Calculations | Output Type | Last Reading |
|---|---|---|---|
| Cisco Unit-Average Temperature | Aggregate (AVG) | Temperature | 18.84°C at 11:40 on May 1, 2018 |
| High Temp and AC Has Failed | Condition | Switch | Off at 11:40 on May 1, 2018 |

FACILITY MONITORING SENSOR

BACKGROUND

For decades, homes and businesses have relied on so called "burglar alarms" and fire alarms for passive security and protection. Modern evolutions include the mandate of smoke and fire alarms, and intrusion detection has evolved to include wireless interconnections and selective access controls. Further, the proliferation of computing hardware often imposes a substantial equipment investment within a business facility. Modern businesses have outgrown conventional fire and intrusion protection. In a business with substantial computing resources, for example, water from fire sprinklers would cause greater damage than the fire they are intended to abate. Modern facility monitoring systems have evolved to collect a variety of parameters relating to a facility, including not only fire and perimeter aspects, but environmental factors such as humidity, temperature and ventilation, thus consolidating the conventional systems that define a facility infrastructure.

SUMMARY

A facility monitoring system, device and application receives and interprets readings from multiple sensors for determining a condition, alert or alarm and initiating appropriate notifications and/or responses. Low-cost, deployed sensors detect or receive a parameter pertaining to a condition in a physical facility space, such as temperature, electric flow, or an open door. A channel to a remote monitoring server or application receives and reports the reading via a user accessible GUI (graphical user interface). A compound or aggregate value is computed from multiple channels based on readings from a plurality of sensors, thus allowing reporting of computed or conclusory conditions based on several related readings, rather than a single scalar sensor value that imposes a burden on the user to deduce or investigate other related sensor readings.

In contrast to conventional approaches, where reporting applications merely pass through sensed values on a one-to-one association with a sensor channel, the disclosed approach defines relations and computations for aggregating multiple sensed values into an aggregate value, and delivers an additional channel having the aggregate value. An aggregation processor defines the computations to be performed on readings from the multiple sensors, and an alert processor defines conditions and alerts representative of issues requiring attention.

Configurations herein are based, in part, on the observation that modern facility monitoring and management systems have a variety of sensors and input devices from which to gather data about conditions in the monitored space. A universal approach to sensor deployment allows a combination of sensors limited only by the number of input connections available on a monitor base. Unfortunately, conventional approaches to facility monitoring suffer from the shortcoming that the monitoring sensors typically provide only raw, unidimensional or scalar data. There is no analysis or interpretation available to identify trends, inferences or conclusions which may be drawn based on multiple sensors. Further, modern Internet connectivity propagates these unitary data items to remote monitoring personnel, who may be compelled to make a determination and possibly an on-site visit based only on a single rogue reading.

Accordingly, the approach discussed below substantially overcomes the shortcomings of conventional facility monitoring systems by defining an aggregate sensor capability that integrates readings from multiple sensors according to aggregation logic defined and computed by the aggregation processor, and then compares the aggregate value according to alert logic before triggering an alarm or indicating an anomaly. Conventional systems merely relay an assortment of monitored sensor readings, leaving it up to the facilities manager, or perhaps a more junior "on-call" person, to draw conclusions about an underlying cause. The disclosed approach, in contrast, coalesces multiple readings to provide a conclusive problem indication, rather than a single blind reading. For example, a high HVAC delivery temperature might point to equipment overheating or even a fire. However, an HVAC health reading that computes the difference between HVAC input and output might reveal that the HVAC is not cooling effectively, narrowing the problem to HVAC efficiency rather than computing appliance overheating. The novel aggregate sensor functionality provides a compound or composite value derived from the multiple, aggregated sensors but treated as an individual sensor value for subsequent readings and alerts.

In a particular configuration as disclosed herein, a method of gathering sensor data from a conditioned space includes identifying a plurality of sensors for monitoring the facility environment, such that each sensor is adapted to detect and transmit a sensed value indicative of the facility environment. A series of channels provides the sensor data to a remote monitoring server (server) that handles sensor data from multiple sites. The server receives data on channels, stores data on each channel for historical reference, and for select channels, evaluates received data for certain values. Typically, key channels are monitored for values outside of a normal range, and an alert is triggered when the channel exhibits deviant or notable values. Not all channels are monitored for alerts, however, and may simply be stored.

An aggregate channel may be created for combining values from two or more channels into a new channel having an aggregate value, effectively defining an aggregate sensor. Such aggregate channels may be evaluated and logged as any other channel. Further, as disclosed in configurations herein, additional logic or computations may be associated with the aggregate channel based on the constituent channels from which the aggregate channel is defined. An aggregation processor identifies aggregate channels that are defined based on other channels, and computes or determines the aggregate values.

Any of the channels may also be evaluated for alerts. An alert is based on a value from a channel deviating from a prescribed value or range. An alert criteria specifies a channel and normal or expected values for that channel. Upon evaluation and detection of a channel value outside its expected norms, an alert is triggered. The alert may be an audible alarm, an automated call to support staff, an automated equipment instruction, such as to close a valve or unlatch a door, or other suitable remedial action. Since the channels, and not specific sensors, are evaluated for alerts, the alert processing does not need to inquire as to whether a channel carries unitary or aggregate values. Channels may even be aggregated from other aggregate channels, allowing a nesting or layering of the aggregate channels and corresponding values.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example implementation of a facility and facility infrastructure suitable for use with configurations herein. Alternate facility arrangements may be employed, in accordance with the principals and advantages of the disclosed approach.

A facility environment 100 may be any suitable enclosed structure such as offices, warehouses, transportation sites, apartments and residential units, and home dwellings. Often the facility environment (facility) 100 is characterized by common ownership entity such as a corporation. At least portions of the facility 100 include machine rooms having computing hardware and related network appliances, with different and/or more specific monitoring and sensing needs than inhabitable conditioned spaces. The facility 100 also often has a well-defined and continuous perimeter with discreet entry and exit portals or passages such as doors and windows.

The facility environment 100 deploys various sensors 110-A . . . 110-C (110 generally) such as temperature, humidity, portal closure/entry, ventilation flow, electric/current flow, motion or any other sensor operable for responsiveness to an environmental or facility infrastructure condition. In a particular configuration, the sensors may be those operable in conjunction with the Room Alert line of products, marketed commercially by AVTECH Software of Warren, R.I.

A typical monitoring environment includes a monitored facility (facility) 100, an on-site monitor 130 with connections to the sensors 110 in the facility 100, and a monitoring server 150 in remote communication with the facility 100, as well as other facilities. In the example facility 100 of FIG. 1, the sensors include a door 110-A, ambient temperature 110-B and HVAC outflow temperature 110-C (110 generally). Sensors 110 may also monitor other aspect, such as ventilation fans 104, HVAC equipment 106, and other equipment and fixtures, and a typically facility may have many more sensors than the presented example. In operation, the onsite monitor 130 periodically receives a reading from each sensor 110 via a respective local connection 112-A . . . 112-C (112 generally). The monitor 130 transmits a message 132 for each reading 112 via a channel 140-A . . . 140-D (140 generally) assigned to a corresponding sensor 110. Any number of sensor readings may be included in the message 132, depending on a polling rate of the sensor 110 and a transmission rate from the monitor 130. The monitoring server 150 is configured to launch and execute applications for receiving parameter values from each of the channels 140, such as application programs from AVTECH as discussed above. The monitoring server 150 also has a Graphical User Interface (GUI) application 160 conversant with the network 134 for remote user interaction via a mobile device.

Figure 1:
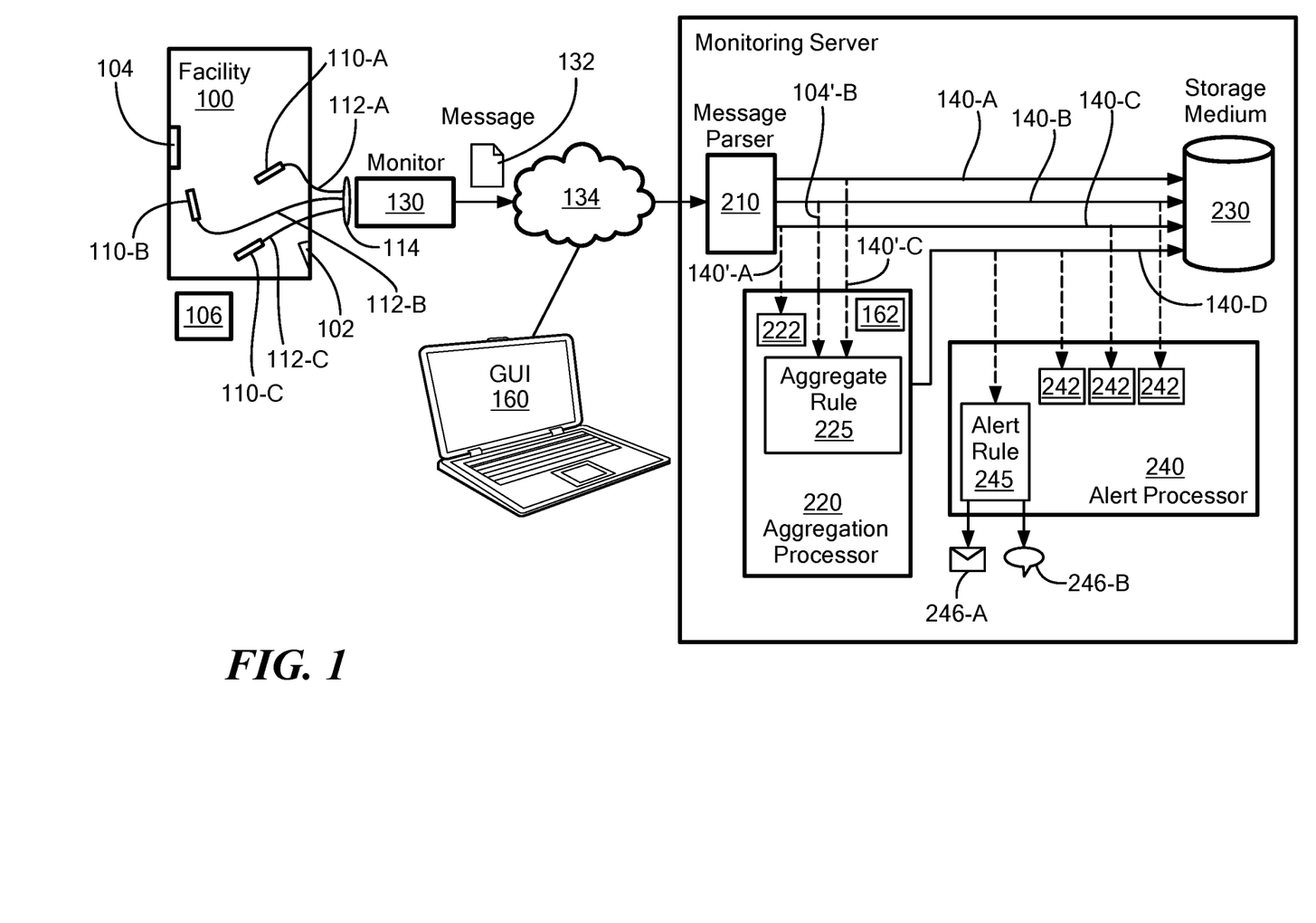
FIG. 1 is a context diagram of a monitored facility environment suitable for use with configurations herein.

Upon message 132 arrival at the monitoring server 150, a message parser 210 parses the message 132 into values with timestamps and determines channels 140-A, 140-B and 140-C (140 generally) corresponding to the respective sensor 110. Since the sensors 110 may have different cycles for reading values, the message 132 may have any number of values corresponding to the channels 140. An ID in the message denotes the sensor and channel.

In the server 150, an aggregation processor 220 identifies and computes the aggregate channels, and an alert processor 240 performs comparisons of the channels with conditions deemed to warrant further action. The values from each of the channels are also stored in a repository defined by a persistent storage medium 230 for historical reports, statistics and trending. Aggregate channels populated by the aggregation processor 220 appear as any other channel to the alert processor 240. The alert processor 240 only maintains channels and criteria indicative of significant deviations, and need not distinguish whether a channel carries a sensed or derived (aggregate) value.

The aggregation processor 220 includes aggregation logic 162 indicative of channels 140 used in determination of aggregate channels, discussed further below in FIG. 2. While the aggregation processor 220 receives and may examine all channels 140'-A . . . 140'-C, based on counterparts 140-A . . . 140-C, it will only retrieve those included in computation of an aggregate channel. For channels that contribute to an aggregate computation (140'-B, 140'-C), the aggregation logic 162 defines an aggregate rule 225. Other channels that carry only sensor values (140'-A) may be ignored 222 by the aggregation processor 220. The aggregation processor 220 computes and provides channel 140-D, which progresses to the alert processor 240 and storage medium 230 with other channels 140-A . . . 140-C.

Alerts may be configured for any channel value. An alert refers to an indication and action resulting from a channel having a value triggering an alert criteria, typically a value outside normal, expected operation ranges. An alert criteria is configurable via the GUI 160, discussed further below. An alert is an optional set of instructions associated with a channel 140 for proactive response to values on that channel. In the example shown, channel 140-D has an alert rule 245 configured. The alert processor 240 filters input channels based on a list of configured alerts and decides whether any alert rule 245 is met on a given channel value at a given time. Not all channels need contribute to alert processing, as they may be merely stored for historical queries and reference. All input channels with no alerts configured 242 will be ignored by the alert processor 240. Once an alert rule 245 for a specific channel 140-D is met, the alert processor performs alert actions configured for the alert. Alert actions can be a variety of actions taken by the alert processor 240 once the alert rule evaluate true, such as sending an email 246-A to a manager, sending a text message 246-B via phone, or sending an http post message to a web API, discussed further below.

Polling and reading are typically handled by the on-site monitor 130. For each of the configured sensors 110, a channel 140 is defined for receiving the sensed value from the monitor 130. At the periodic interval, the monitoring server 150 receives, from the monitor 130 at the facility, readings from each configured sensor 110 at the facility 100. It should be noted that the monitoring server 150 is typically coupled to a plurality of individual monitors 130 on-site at various facilities under the oversight of the monitoring server 150.

Figure 2:
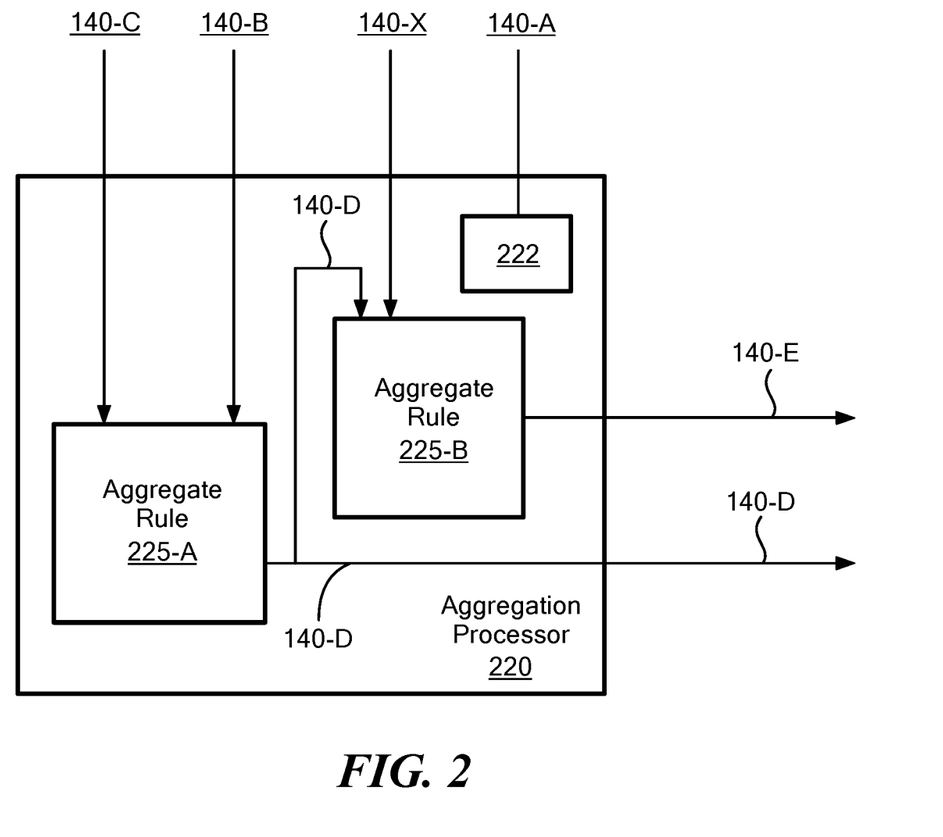
FIG. 2 shows an aggregation processor for sensors of FIG. 1.

FIG. 2 is an illustration of a more detailed configuration of the aggregation processor 220. Referring to FIGS. 1 and 2, the aggregation processor 220 may contain any suitable number of aggregate rules 225-A . . . 225-B (225 generally). Each rule is comprised of one or more inputs and typically one output. The inputs can include sensed readings or readings calculated from other rules. In this example, the aggregate rule 225-A takes values of channels 140-B and 140-C as input and after applying the aggregate logic 162, it produces an output value for channel 140-D. Aggregate rule 225-B takes the new channel 140-D and received channel 140-X values as its inputs and calculates the channel value for 140-E. In this example, Input data 222 by channel 140-A, are ignored by the aggregation processor 220 as there are no aggregate rules using that input data at this time. Both values 140-D, and 140-E, alongside original values 140-A, 140-B, 140-C and 140-X will be persisted in storage medium 230, as well as being processed by the alert processor 240. It should be noted that channel 140-D illustrates a calculated channel being used as input for another calculated channel resulting in channel 140-E. The output from the aggregation processor 220 merges with the stream of channels emerging from the parser 210 such that the alert processor 240 and storage medium 230 require no modifications as they seamlessly continue to process channels.

Within the aggregation processor 220, the aggregation logic 162 stores rules that define the aggregate channels and the computations used to derive them. For aggregation processing, the aggregation processor 220 maintains a set or list of the channels received by the parser 210 that are included in aggregation rules. For each channel 140' received, the aggregation processor 220 determines if it is employed in an aggregate channel computation. If so, the channel value is retained along with others 140' for computing the aggregate channel. When a new aggregate channel is computed, such as 140-D, it is further evaluated to determine if it is invoked in an aggregation rules, such as 225-B. In this manner, the aggregation processor 220 evaluates channels 140 to determine if they contribute to any of the aggregate rules 225-A . . . 225-N, and are ignored 222 if unused. This logic is formalized in FIG. 3 below.

Figure 3:
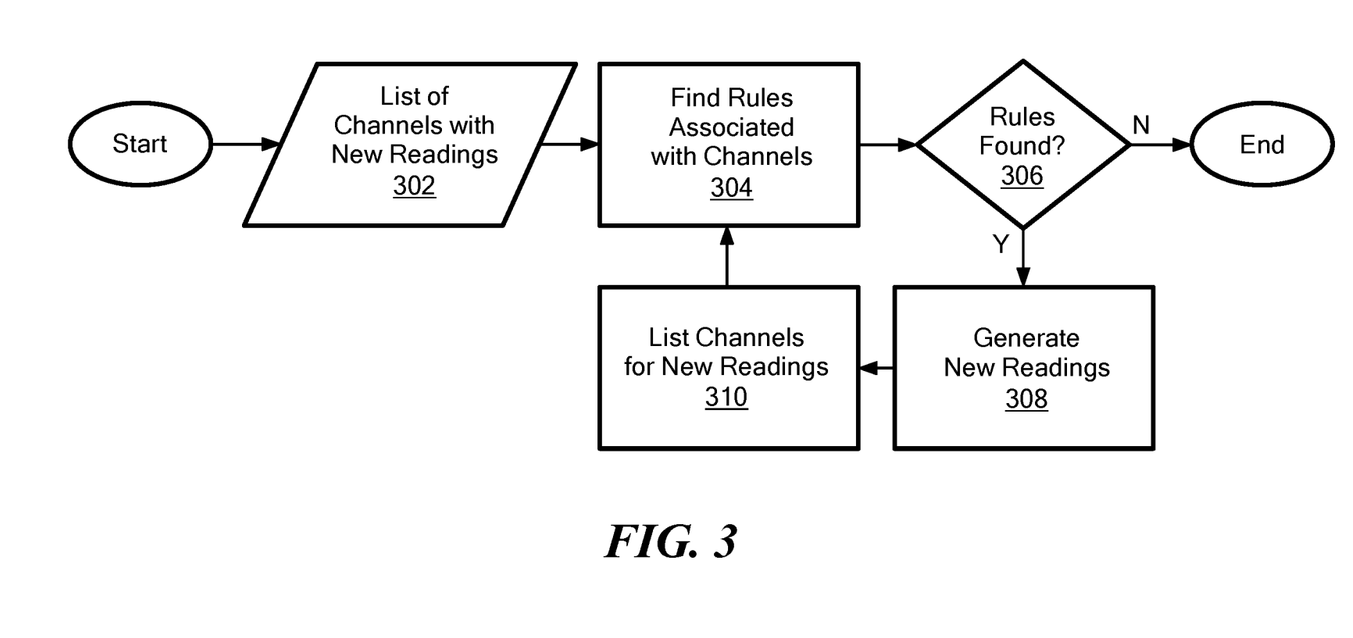
FIG. 3 shows a logic flow within the aggregation processor of FIG. 1.

FIG. 3 consolidates the logic flow within the aggregation processor 220. Referring to FIGS. 1 and 3, when a message 132 is received by the monitoring server 150 as illustrated in FIG. 1, the aggregation processor 220 receives a list of all channels that have new sensed data from the facility 100, as depicted at step 302. The aggregation processor 220 then searches for all aggregate rules 225-N that are associated with the incoming channel readings, as shown at step 304. In step 306, if the search did not find any aggregate rules, the logic flow ends. Otherwise, control passes to step 308 where new readings are calculated based on the aggregate rules found in step 304. A list of channels with the new readings is then prepared in step 310 and control passes back to step 304. The logic flow repeats until there are no aggregate rules associated with the last set of newly calculated readings. After the aggregation processor 220 logic flow has ended, all the newly created channel readings from step 308 are passed on to the storage medium 230 and the alert processor 240.

Aggregate rules provided in the aggregation processor 220 include three types of rules:
Aggregate Functions.
Condition.
Custom Formula.

The aggregate function type allows a user input indicative of an aggregate function to apply to all input values as a list, such as average, sum, min or max. With the condition type, the user input may specify a value comparison test for each input. (>, <, =). The user will also specify which Boolean operations should be used to combine the results into a single Boolean value. The condition type will always produce a Boolean output value. For the custom formula type, user input is received for generating a custom mathematical formula to describe the aggregate rule for the channel. When evaluated, the aggregate rule will apply the input values to the custom formula to produce the new output value. Further details about generation and formation of user input is discussed below with reference to the GUI. Other suitable arrangements for deriving aggregate channels may be performed by identifying a range of output values and a manner of determination based on a plurality of channels.

Figure 4:
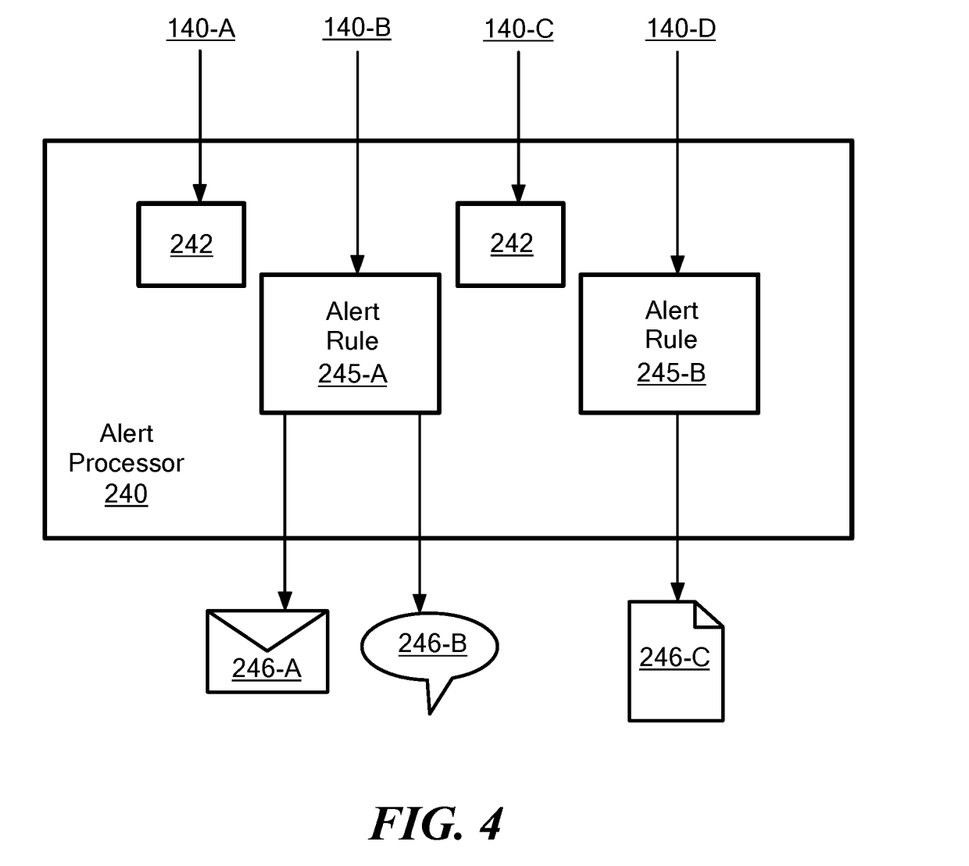
FIG. 4 shows operation of an alert processor in the monitoring server of FIG. 1.

FIG. 4 illustrates an example scenario of the alert processor 240. Referring to FIGS. 1 and 4, the alert processor 240 may have any number of alert rules. Each alert rule accepts at least one channel reading as input, and one or more actions to perform. The alert processor 240 searches for alert rules that define conditions based on currently received channel values. Once matches are found, alert rule 245-A processes channel 140-B values and if conditions specified in the alert are met it sends an email 246-A and a text message 246-B. Similarly, alert rule 245-B receives channel 140-D's value and if the condition holds true, it fires an http post action 246-C accordingly. In this example there are no alerts configured for 140-A or 140-C, so the values are ignored 242 by alert processor 240.

The alert processor 240 evaluates all channels 140 for which alerts have been configured, and does not discriminate between aggregate and single-sensed values. In many instances, alerts may not be configured for channels if the values contained on those channels are for diagnostic or informational purposes, and would not represent an exigent situation even at an extreme value. Generally, alerts look to a value of a single channel and a condition specifying an alert criteria. If multiple values contribute to an alert criteria, the individual channels concerned are first defined as an aggregate channel, and the alert criteria specified in terms of the values on the aggregate channel. Any suitable response action may be specified. Email, text, and post commands are employed as examples of notification, but invocation of apps or other entity could also be performed.

Figure 5:
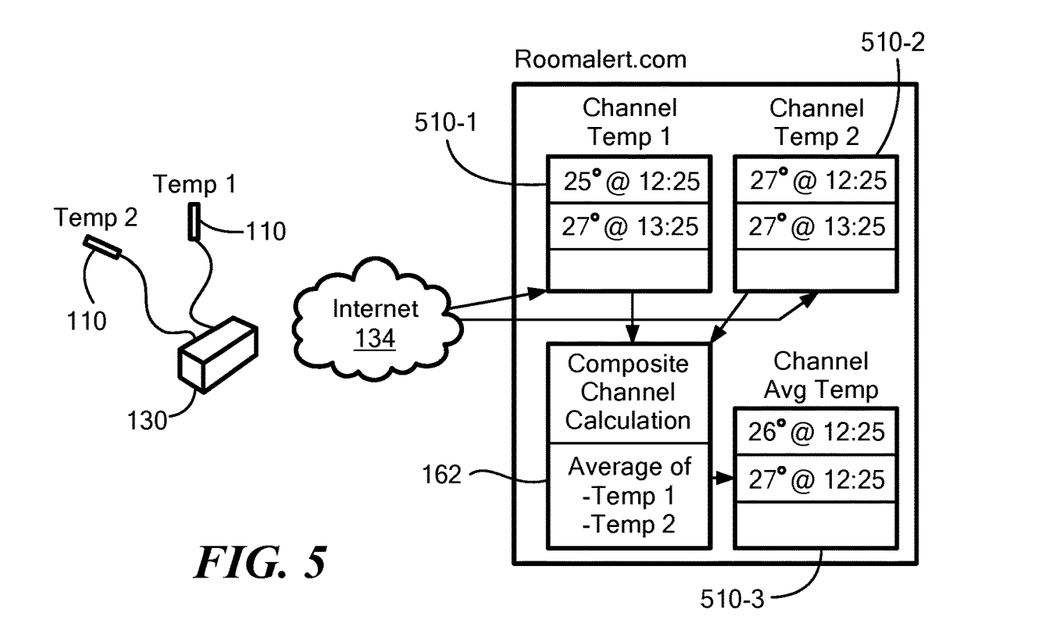
FIG. 5 shows computation of an aggregate value using the aggregation processor.

FIG. 5 shows an example computation of a time-differentiated sequence of aggregate values using the aggregation processor 220. Referring to FIGS. 1 and 5, history logs 510-1 . . . 510-3 (510 generally) reside on the storage medium 230 and, for each of 3 channels 140, store a sequence of times and parameter values. Logs 510-1 and 510-2 are sensed values from the monitor 130, while aggregation processor 220 computes the stream of aggregate values for log 510-3.

Figure 6:
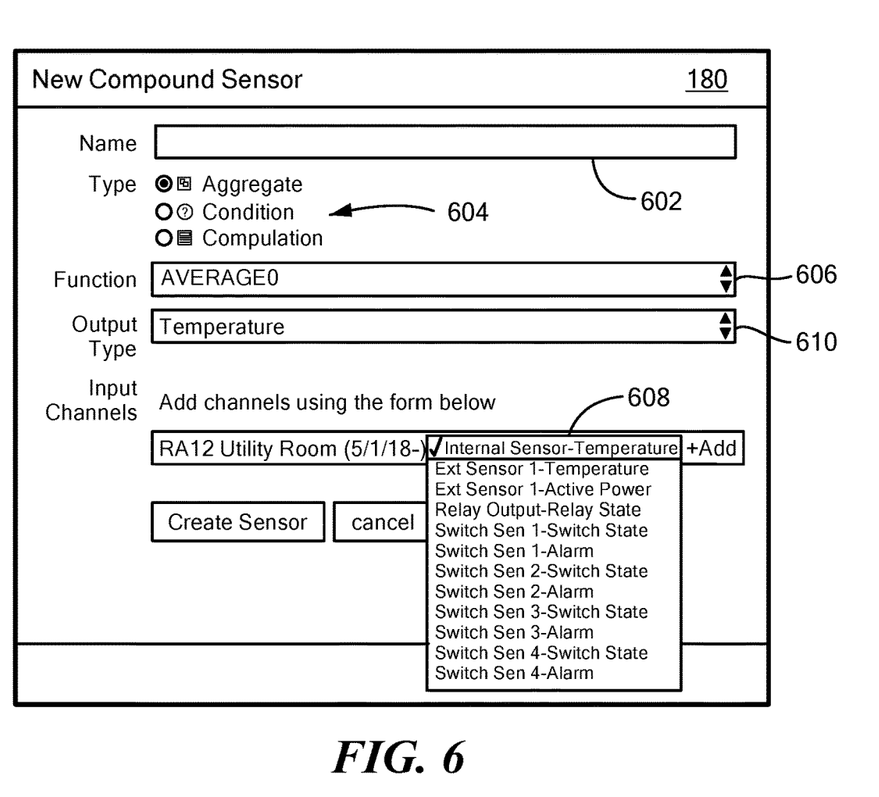
FIG. 6 shows definition of an aggregate sensor using an aggregate function.

FIG. 6 shows definition of an aggregate sensor using an aggregate function for defining the aggregation logic 162 in the aggregation processor 220. Referring to FIGS. 1 and 6, a screen 180 on a rendering device receives, via the GUI 160, an operation and one or more parameter values for employed in computation of the aggregate value. Definition of the aggregate value therefore includes receiving, from a GUI (Graphical User Interface), commands for defining the aggregation processor for each of the aggregate values, such that the commands include an indication of the sensor readings and channels used for computing the aggregate value, and operations to be performed on the sensor readings (e.g. average, sum, difference, etc.). The aggregation processor 220 defines a new channel for the result to be returned as the aggregate sensor value. The new channel 140 is therefore defined as the result of application of the aggregation processor using the sensed values defining the selected parameter values.

A name 602 defines a mnemonic label, such as "temp delta." A selection bullet 604 indicates aggregate rule type selection, "Aggregate" in the example shown. A function 606 defines the operation to be performed on the channels 140, and a pulldown 608 specifies the existing channels 140 to be used for the selected operation. The function 606 and channels 608 may vary with the other aggregate rule types. An aggregate rule, such as min, max, average and sum, accepts an arbitrary number of input channels and applies the function 606 specified. A condition type (FIG. 7, below) returns a Boolean true or false result, and requires binary values (two channels or a channel and a constant) and a binary operator (<, >, =, !=). A computation type employs mathematical operations for computing a numerical result. Other suitable approaches may be employed for defining the aggregate channel output based on input channels. An output type 610 specifies the new channel, for both reporting and usage in other aggregate rules. A numeric temperature value is shown; other channels may carry Boolean or other numeric types.

Figure 7:
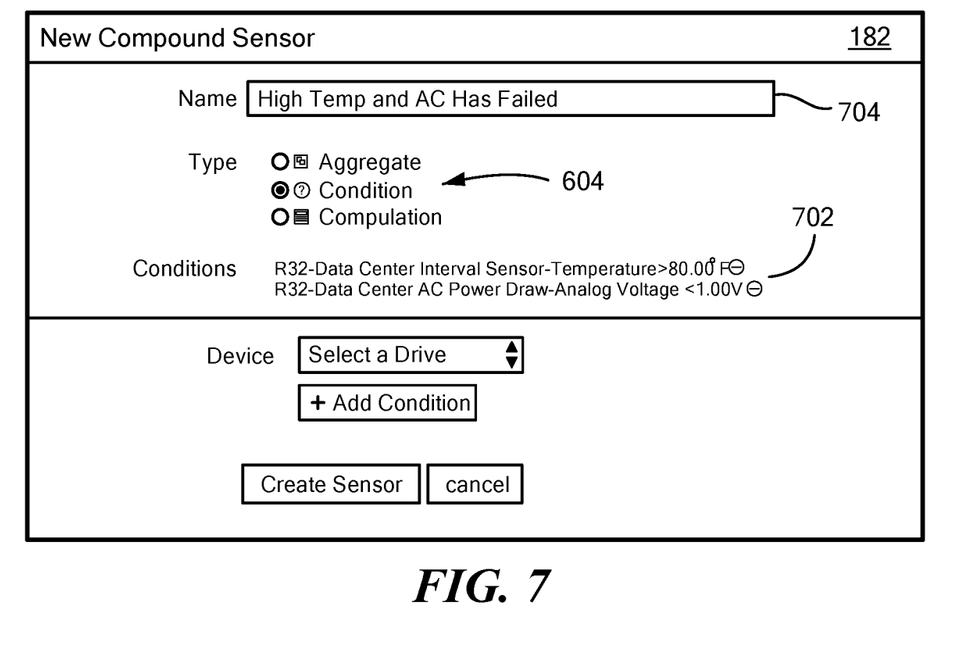
FIG. 7 shows definition of an aggregate sensor using a condition rule.

FIG. 7 shows definition of an aggregate sensor using a condition rule. A condition rule defines a comparison of values for generating a Boolean value that may be evaluated for an alert, discussed below. A name field 704 receives a mnemonic designator for the aggregate sensor value. The bullet list 604 is selectable for a "condition" definition for this aggregate sensor. A condition 702 defines logical comparisons, and may include any suitable condition expression, which may be expressed as a sequence of conjunctive and/or disjunctive associations. The result is a new aggregate sensor that provides a value of true or false which may be subsequently evaluated by the alert processor 240.

The bullet list 604 may include various options for defining an aggregate sensor. The computation selection allows mathematical operations to be performed on channel values for rendering the aggregate sensor channel. Other suitable approaches may be employed for aggregating the channels, such as a script, launchable app., or other instructions for computing an aggregate value based on a plurality of the sensor readings received from the channels.

Figure 8:
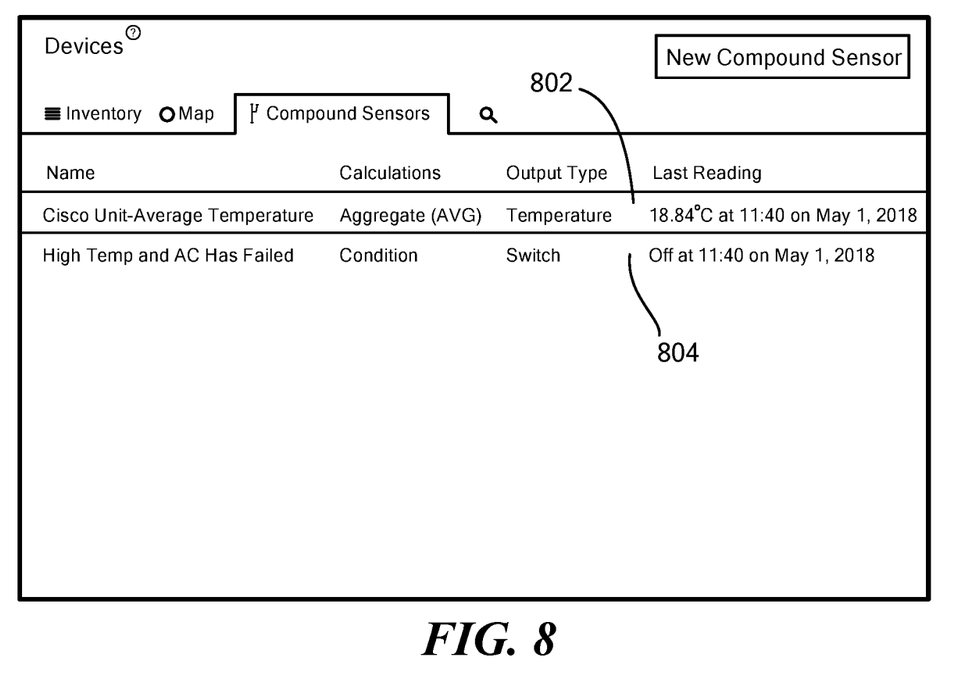
FIG. 8 shows a report of aggregate values and conditions as in FIG. 7.

FIG. 8 shows a report of aggregate values and conditions as in FIG. 7. FIG. 8 reflects the aggregate values defined in FIGS. 6 and 7 as a sensor and channel that may be employed for conditions and alerts. A line item 802 denotes an aggregate sensor as reflecting an average temperature, as defined in rendering screen 180. Line item 804 denotes the "High temp AC failed" channel defined in screen 182.

Figure 9:
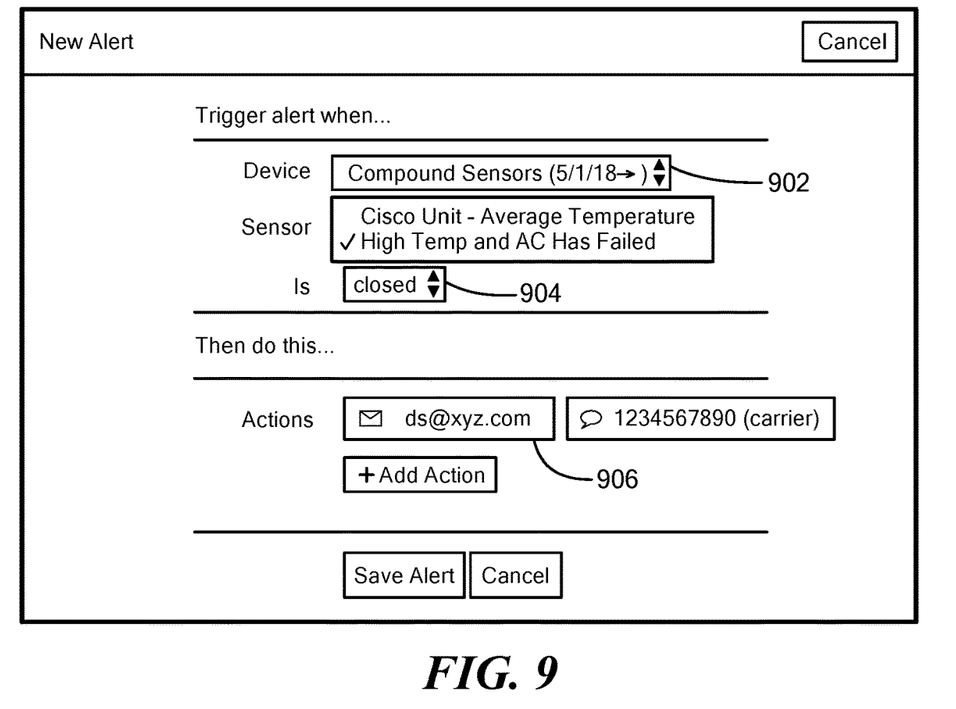
FIG. 9 shows definition of an alert based on values as in FIG. 8.

FIG. 9. shows definition of an alert rule. In this example, the alert is based on the aggregate sensor defined in the example of FIG. 7. In FIG. 9, the alert indicates a responsive action to take. Referring to FIGS. 1, 7 and 9, the sensor selection pulldown fields 902 reflect the sensor to be used as input for the alert rule. A condition field 904 defines the condition or threshold that will trigger the alert. In this example, the condition "Closed" indicates that the threshold value for the input sensor "High Temp AC Has Failed" is "true". For numeric conditions (e.g. equalities and range comparisons) additional drop downs are provided. The responsive action fields 906 receives entry of responsive steps 246, such as emailing a manager or staff member on-call to address the situation. Multiple and/or alternative responsive actions may by incurred, such as calling or texting the on-call party.

Figure 10:
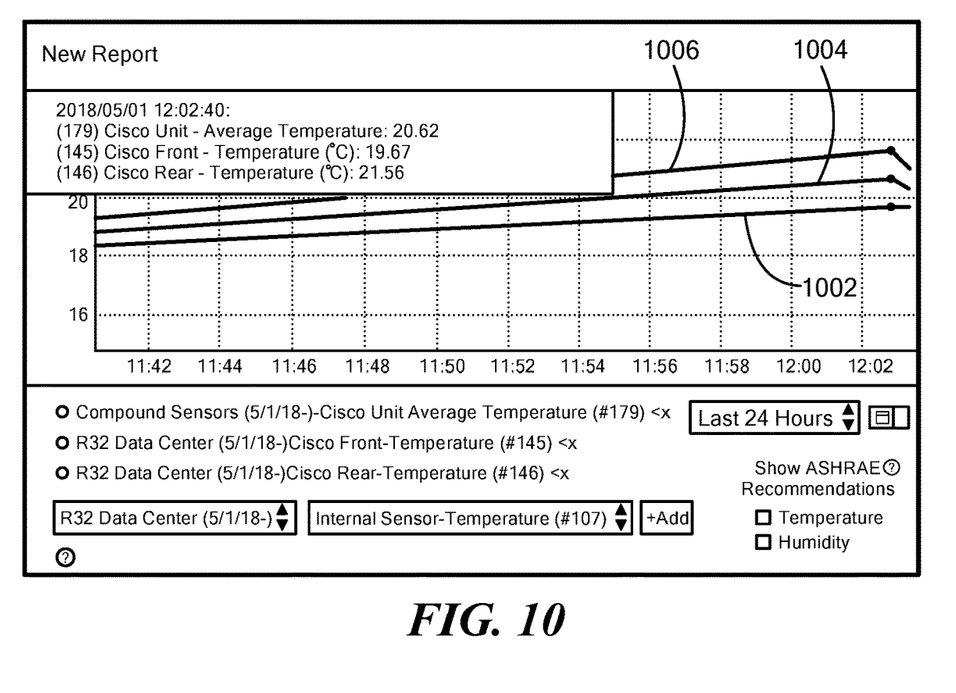
FIG. 10 shows a historical report of aggregate and sensed values.

FIG. 10 shows a historical report of aggregate and sensed values. As indicated above, the monitoring server 150 stores parameter values for both sensed values and aggregate values. The graphs of FIG. 10 plot the sensed and aggregate parameter values together. Graph line 1002 renders a sensed value from the rear of a networking unit. Graph line 1006 renders a sensed value from the front of a networking unit. The aggregate value computed from the aggregation processor 220 above defines the average temperature, shown as graph line 1004. Visual inspection for this computation yields an expected average running between the two contributing sensed values.

In another example, environmental sensors and perimeter sensors may be combined. An open door and a nearby temperature sensor may result in the nearby sensor reading significantly lower than other sensors. A condition for a "delivery state" may compute an average temperature across all temperature sensors, but then perform a min/max operation to identify if a sole sensor is bringing down the average. An alert would only trigger if the average is low and an open door was not shown, based on reasoning that the open door would cause the temperature to temporarily drop. Alternate configurations may inject temporal and historical aspects to consider previous event windows.

Another example correlates temperature and humidity. Opening a door allows an exchange of outside air affecting both temperature and humidity. In the case of a humidity sensitive ware such as salt, humidity causes degradation of the salt stock. An open door allows a temperature fluctuation which is quickly remedied by the building HVAC, yet the humidity tends to persist in the region of the open door. An aggregate reading based on the temperature, humidity and door closure could detect excess humidity entering through the open door that are not shown or expected merely from temperature monitoring.

Those skilled in the art should readily appreciate that electronic logic and instructions as disclosed herein are open to implementation in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a facility environment having a plurality of sensors deployed around a facility defined by a perimeter and an area for sensing environmental and ingress/egress conditions, a method of gathering sensor data, comprising:
    associating, at a monitoring server, a channel with each of the sensors in the facility environment, each channel configured to transport and store a value for the associated sensor;
    receiving, from a GUI, a selection of an aggregation function and a selection of one or more channels employed in computation of an aggregate value;
    receiving, from each of a plurality channels in the facility environment, a sensor reading indicative of a physical condition or occurrence in the facility environment;
    combining readings from the selected channels into a new channel having a value computed from the combined readings based on computing the aggregate value by retrieving the values from the selected channels and performing the aggregation function for computing a value for the new channel; and
    storing the computed value in a history file with the readings from the other channels, the history file responsive to chronological inquires based on the channels.

2. The method of claim 1 further comprising receiving a message from a monitor, the monitor deployed at the facility and coupled to each of the sensors at the facility, the received message including at least one sensed value from the plurality of sensors, and an identity of the channel associated with the sensor.

3. The method of claim 1 further comprising:
    monitoring at least one of the channels associated with the facility environment by periodically receiving or computing the value from the channel;
    periodically gathering each of the values in the monitored channels for comparison with operating parameters indicative of abnormal operation; and
    invoking an alert processor for comparison of the channel values with the operating parameter based on the alert criteria.

4. The method of claim 3 further comprising receiving, from a GUI, an alert criteria including:
    a operating parameter indicative of operational limits of the facility environment;
    a channel having a value based on readings from the facility environment; and
    a comparison for determining operation outside the limits.

5. The method of claim 4 further comprising:
    determining if a channel value triggers the alert criteria; and
    invoking a notification defined for the alert criteria.

6. The method of claim 1 further comprising:
    assigning a channel to each of the sensors in the facility environment;
    periodically receiving a message indicative of a value from each of the assigned channels, the message based on a polling interval for reading each of the sensors in the facility environment.

7. The method of claim 1 further comprising computing the aggregate value following network transmission of the channels in the facility environment used to compute the aggregate value.

8. The method of claim 1 wherein the aggregate channel originates at a network destination of the message including the sensor reading based on the sensors in the facility environment.

9. In a facility environment having a plurality of sensors deployed around a facility defined by a perimeter and an area, the facility associated with operating parameters defining environmental and ingress/egress conditions, a method of gathering data regarding a facility environment, comprising:
    associating, at a monitoring server, a channel with each of the operating parameters for the facility environment, the channel configured to store received sensor readings;
    receiving, from each of a plurality of sensors deployed in the facility environment, the sensor reading indicative of a physical condition or occurrence in the facility environment;
    invoking an aggregation processor for computing an aggregate value based on a plurality of the sensor readings;
    determining, based on aggregation logic in the aggregation processor, the channels used for computing the aggregate value;
    computing the aggregate value from the determined channels;
    defining a new channel for storing the computed aggregate value;
    storing the aggregate value in the new channel;
    comparing the aggregate value with an alert criteria, the alert criteria indicative of whether the aggregate value denotes a notable condition in the facility environment; and
    based on the comparison, performing at least one of storing or reporting the compared aggregate value.

10. The method of claim 9 further comprising receiving an identity of each of the plurality of sensors configured in the facility environment, the sensors deployed in locations around the facility environment for detecting physical parameters indicative of environmental and perimeter attributes pertinent to integrity of the facility environment.

11. The method of claim 9 further comprising:
    monitoring a plurality of parameter values associated with the facility environment, the parameter values defined by values carried on channels based on conditions in the facility environment;
    periodically gathering each of the monitored parameter values for comparison with operating parameters indicative of expected operating conditions;
    computing the aggregate value based on the aggregation logic defined for the aggregate value, and invoking an alert processor for comparison of the aggregate value with an operating parameter based on an alert criteria.

12. The method of claim 9 further comprising:
    receiving, from a GUI, a selection of an aggregation function and one or more channels employed in computation of an aggregate value; and
    computing the aggregate value by retrieving the values from the selected channels and applying the aggregation function.

13. The method of claim 9 further comprising receiving, from a GUI (Graphical User Interface), commands for defining the aggregation function for the aggregate value, the commands including:
- i an indication of the channels used for computing the aggregate value;
- ii operations to be performed on the values from the channels; and
- iii the result to be returned as the aggregate value.

14. The method of claim 9 further comprising receiving, from a GUI, the alert criteria specifying:
- a operating parameter defined based on normal operational limits of the facility environment;
- a channel value based on readings from the facility environment; and
- a comparison for determining operation outside the normal operation limits based on the channel value.

15. A facility monitoring server device responsive to a facility environment having a plurality of sensors deployed around a facility defined by a perimeter and an area, the facility associated with operating parameters defining normal environmental and ingress/egress conditions, comprising:
- an interface for receiving, for each of a plurality of sensors deployed in the facility environment, a channel associated with each of the sensors in the facility environment, each channel configured to transport and store a parameter value for the associated sensor;
- a graphical user interface (GUI) for receiving a selection of an aggregation function and a selection of two or more channels employed in computation of an aggregate value;
- an aggregation processor configured to compute an aggregate value based on combined readings from the selected channels into a new channel having a value computed from the combined readings, including computing the aggregate value by retrieving the values from the selected channels and performing the aggregation function for computing a value for the new channel;
- a storage interface to a repository for storing the aggregate value in a history file with the readings from the other channels, the history file responsive to chronological inquires based on the channels; and
- an alert processor configured to compare, based on an operating parameter and an alert criteria, whether the aggregate value is indicative of a notable occurrence in the facility environment.

16. The device of claim 15 wherein the interface to the facility is configured to receive a message from a monitor, the monitor deployed at the facility and coupled to each of the sensors at the facility, the received message including at least one sensed value from the plurality of sensors, and an identity of the channel associated with the sensor.

17. The method of claim 15 wherein:
- the GUI is for receiving, a selection of an aggregation function and one or more channels employed in computation of an aggregate value; and
- the aggregation processor is for computing the aggregate value by retrieving the values from the selected channels and performing the aggregation function for computing a value for the new channel.

18. The device of claim 15 wherein the alert processor is configured to:
- monitor at least one of the channels associated with the facility environment by periodically receiving or computing the value from the channel;
- periodically gather each of the values in the monitored channels for comparison with operating parameters indicative of expected operation; and
- invoke an alert processor for comparison of the channel values with the operating parameter based on the alert criteria.

* * * * *